United States Patent
Kwon

[19]

[11] Patent Number: 5,913,892
[45] Date of Patent: Jun. 22, 1999

[54] COMPRESSOR FIXTURE STRUCTURE FOR A REFRIGERATOR

[75] Inventor: Hyuk-Jang Kwon, Incheon, Rep. of Korea

[73] Assignee: Daewoo Electronics Co., Ltd., Seoul, Rep. of Korea

[21] Appl. No.: 08/982,373

[22] Filed: Dec. 2, 1997

[30] Foreign Application Priority Data

Dec. 27, 1996 [KR] Rep. of Korea ................... 96-59118

[51] Int. Cl.⁶ .................................................. F25D 19/00
[52] U.S. Cl. .............................. 62/296; 62/297; 248/624; 417/363
[58] Field of Search ...................... 62/296, 297; 248/618, 248/622, 624; 417/363

[56] References Cited

U.S. PATENT DOCUMENTS

| | | | |
|---|---|---|---|
| 3,785,167 | 1/1974 | Sahs | 62/296 |
| 4,891,955 | 1/1990 | Klausing et al. | 62/297 |

FOREIGN PATENT DOCUMENTS 275909  2/1990  Germany ................................... 62/296

*Primary Examiner*—William E. Tapolcai
*Attorney, Agent, or Firm*—Smith, Gambrell & Russell, LLP; Beveridge, DeGrandi, Weilacher & Young Intellectual Property Group

[57] ABSTRACT

A compressor fixture structure for a refrigerator comprises a plurality of compressor fixture structure units. Each of the compressor fixture structure units includes a support, a moving member, a spring, a compressor support, a fixing shaft, and hollow cylindrical buffer members. The support has a first spring fixing member on the center portion thereof and two side walls at both ends each upper portion of which is outwardly slanted. The moving members have an upper plate and a lower plate and a second spring fixing member formed on the lower plate. The spring is fixedly inserted between the first spring fixing member and the second spring fixing member. The compressor support is placed on the moving member. The fixing shaft is inserted through the moving member and the compressor support. The two hollow cylindrical buffer members are fixed between the slanted upper portion and the lower plate, respectively.

4 Claims, 3 Drawing Sheets

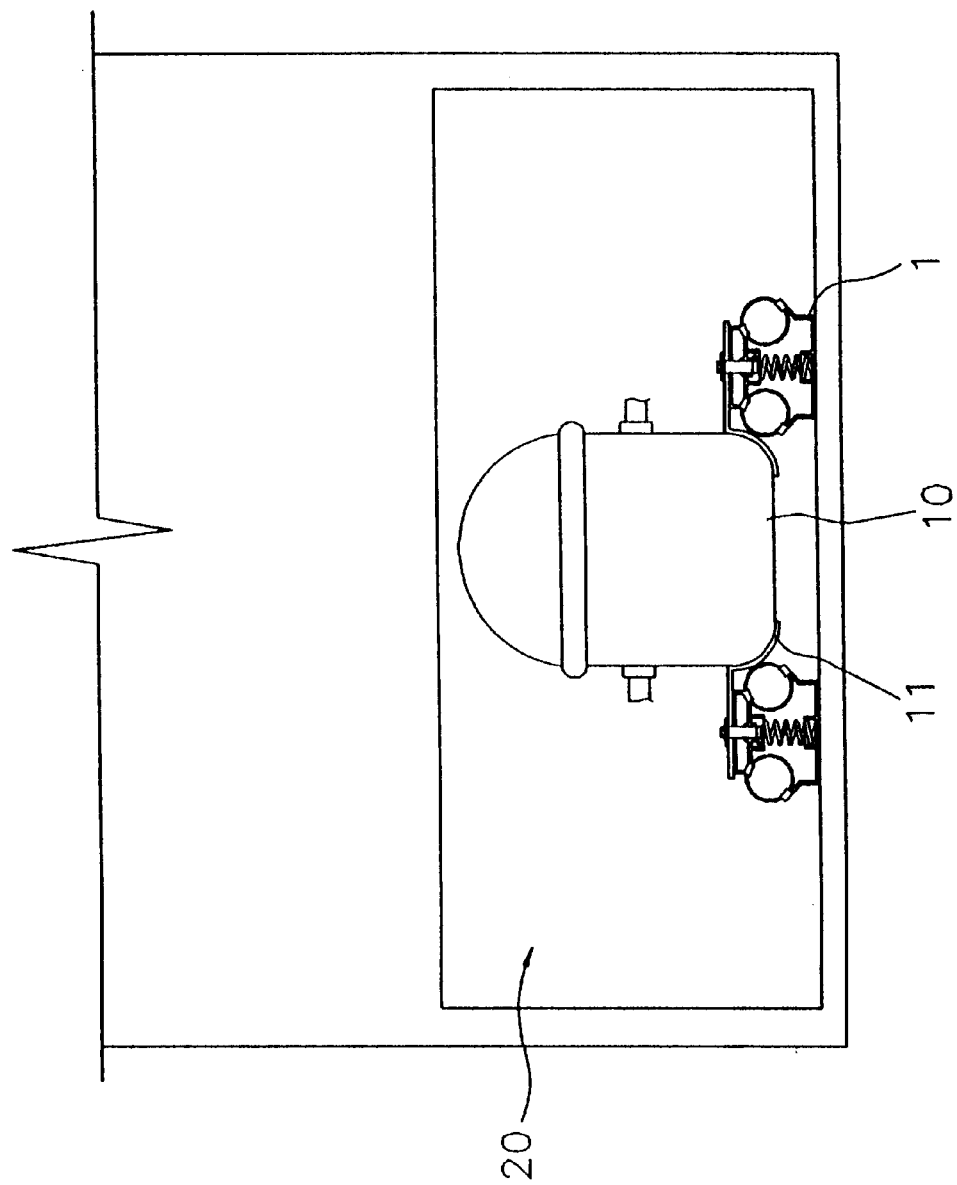

COMPRESSOR FIXTURE STRUCTURE FOR A REFRIGERATOR

BACKGROUND OF THE INVENTION

1. Field of the Invention

The present invention relates to a refrigerator, and more particularly to a compressor fixture structure for a refrigerator.

2. Prior Art

In general, a machine room is formed in a lower rear portion of a refrigerator, and the machine room accommodates a compressor, a condenser, a cooling fan, and an evaporator tray therein. As shown in FIG. 1, The compressor is fixedly supported by 2 compressor support members 11 each of which is fixed by a bolt 12 welded into the bottom of the machine room 20. As shown in FIG. 2, a spring 13 is inserted over the bolt 12, and then one of the compressor support members 11, each having a buffer rubber 14 is inserted over the bolt 12 to be placed on one end of the spring 13. The buffer rubber 14 has an opening for insertion of one of the compressor support members 11 over the bolt 12. A washer 15 is forced to be mounted into a groove formed around the end portion of the bolt 12, to thereby prevent the buffer rubber 14 from coming off the bolt 12. Therefore, vibration of the compressor 10 during operation is absorbed by the spring 12 and the buffer rubber 14 to minimize vibration transfer from the compressor 10 to the bottom of the machine room of the refrigerator.

The vibration of the compressor 10 during operation is generated in the vertical direction as well as in the horizontal direction simultaneously. The conventional compressor fixture structure as shown in FIG. 1 is adapted to decrease the vibration in the vertical direction, but not to properly absorb the vibration in the horizontal direction which is simultaneously generated together with the vertical vibration. Therefore, a drawback exists in that the compressor vibration is transferred to the refrigerator cabinet and doors through a coolant pipe.

SUMMARY OF THE INVENTION

In order to solve the drawback, it is an object of the present invention to provide a compressor fixture structure for a refrigerator for buffering and absorbing horizontal and vertical vibration of the compressor.

To obtain the above, the compressor fixture structure for a refrigerator according to the present invention comprises a plurality of compressor fixture structure units. Each compressor fixture structure unit has a support, a spring, a moving member, a compressor support, a fixing shaft, and two hollow cylindrical buffer members.

The support is fixedly placed on the bottom of a machine room of a refrigerator. The support has a first spring fixing member on the center portion thereof and two side walls at both ends each upper portion of which is outwardly slanted. One end of the spring is fixedly inserted in the spring fixing member.

The moving member has an upper plate and a lower plate which are interconnected to each other at both ends, and an opening is formed in the upper and lower plates, respectively. A second spring fixing member is formed on the lower plate around the opening. The other end of the spring is inserted in the second spring fixing member. The compressor support is placed on the moving member. The fixing shaft is inserted through the moving member and the compressor support and fixed by washers. The two hollow cylindrical buffer members are fixed between the slanted upper portion and the lower plate, respectively.

BRIEF DESCRIPTION OF THE DRAWINGS

The above objects and other advantages of the present invention will become more apparent by describing in detail a preferred embodiment thereof with reference to the attached drawings in which:

FIG. 5 is a view for showing the compressor fixture structure arranged in a refrigerator.

DETAILED DESCRIPTION OF THE PREFERRED EMBODIMENT

Hereinafter, the compressor fixture structure for a refrigerator according to an embodiment of the present invention will be described in detail with reference to the attached drawings.

The compressor fixture structure comprises two compressor fixture structure units. The compressor fixture structure units are the same, so that only one compressor fixture structure unit 35 will be described below in detail.

Figure 1:
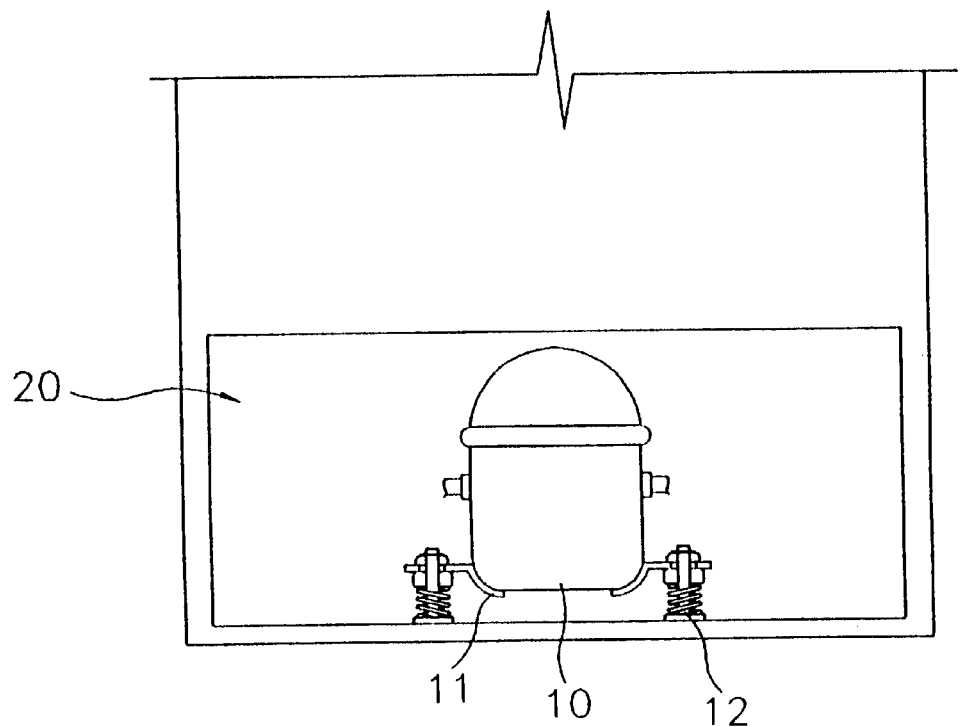
FIG. 1 is a view for showing a conventional compressor fixture structure for a refrigerator.
Figure 2:
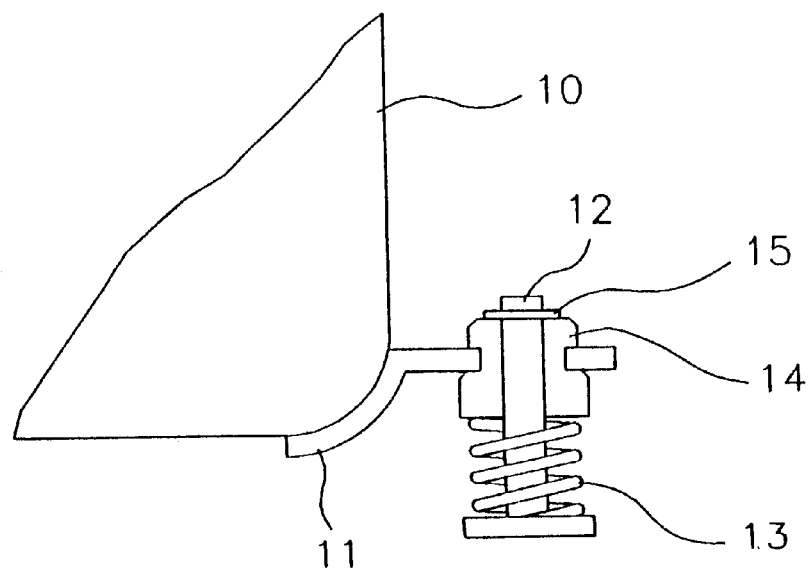
FIG. 2 is an enlarged view for showing the main portion of FIG. 1 in detail.
Figure 3:
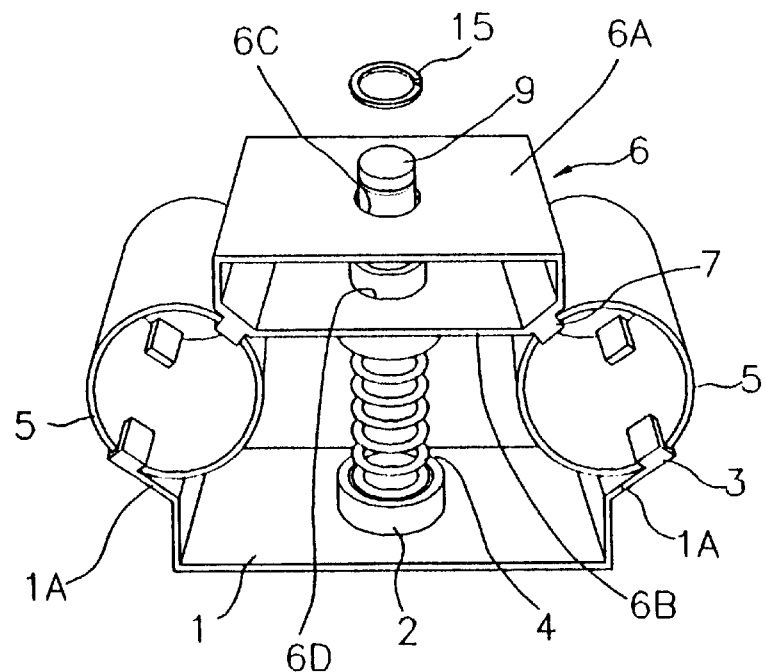
FIG. 3 is a view for showing a main portion of one of a plurality of compressor fixture structure units of a compressor fixture structure according to an embodiment of the present invention.
Figure 4:
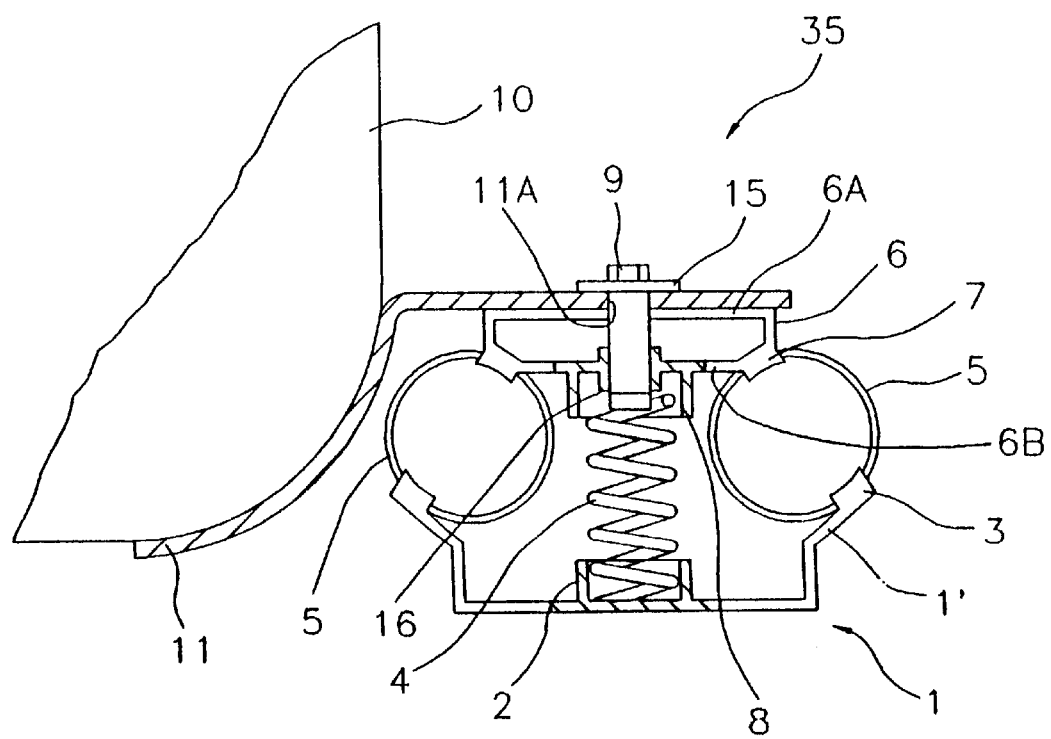
FIG. 4 is a cross-sectional view for showing one compressor fixture structure unit supporting a compressor.

FIG. 3 is a perspective view for showing one compressor fixture structure unit 35 according to an embodiment of the present invention before the compressor is placed on, and FIG. 4 is a cross-sectional view for the compressor fixture structure unit 35 of FIG. 3. As shown in FIGS. 3 and 4, one compressor fixture structure unit 35 has a support 1 which is welded into the inner bottom of a machine room of a refrigerator. A spring 8, a moving member 6, and a compressor support 11 are mounted over the support 1 in the order as listed.

A hollow cylindrical buffer member 5 is made of a thin elastic iron plate and placed on each of both side walls 1A of the support 1. The support 1 has a first spring fixing member 2 on the upper surface thereof, and one end of a spring 4 is fixedly inserted in the first spring fixing member 2. Each of the side walls 1A is perpendicularly bent upwards, and the upper portion of the perpendicularly bent side wall 1A is slanted outwards. The slanted side wall has two hook parts 3, each of which is formed at opposite sides on the edges of the slanted side walls 1A. The hollow cylindrical buffer member 5 is fixedly inserted between the first two hook parts 3. The moving member 6 is mounted over the spring 4, the lower end of which is inserted in the spring fixing member 2. The moving member 6 has an upper plate 6A and a lower plate 6B which are interconnected to each other at both of their ends, and openings 6C and 6D are formed in the upper and lower plates 6A and 6B, respectively. A second spring fixing member 8 is formed on the lower plate 6B around the opening 6D. The other end of the spring 4 is inserted in the second spring fixing member 8. The lower plate 6B has second two hook parts 7 respectively corresponding to the first two hook parts 3 of the slanted side walls 1A. Therefore, as shown in FIG. 3, there are two pairs of first two hook parts and two pairs of second two hook parts. Therefore, one hollow cylindrical buffer member 5 can be held by the first two hook parts and the second two hook parts. The other hollow cylindrical buffer member 5 can be held by the other first two hook parts and the other second two hook parts, as shown in FIGS. 3 and 4.

Further, the fixing shaft 9 penetrates the moving member 6 through the openings 6C and 6D, and the fixing shaft 9 is inserted into the compressor support 11 through an opening 11A over the moving member 6. After the insertion of the compressor support 11 over the moving member 6, washers 15 and 16 are inserted around the upper portion and the lower portion of the fixing shaft 9, respectively, as shown in FIG. 4 to fix the compressor support 11 to the moving member 6. FIG. 5 shows the compressor fixture structure arranged in a refrigerator.

In the meantime, since the hollow cylindrical buffer member 5 is made of a thin elastic iron plate, the hollow cylindrical buffer member 5 is usually in a shape of a circle in cross section but in an elliptical shape when bearing vibration or impact externally. The elliptical shape of the hollow cylindrical buffer member 5 can be easily returned to its original shape of a circle.

In the compressor fixture structure unit of the compressor fixture structure according to an embodiment of the present invention, when the compressor 10 supported by the compressor support 11 vibrates in the horizontal and vertical directions simultaneously, the moving member 6 vibrates in accordance with the vibration of the compressor 10 since the vibration is transferred to the moving member 6 through the compressor support 11. The vertical vibration is mainly absorbed and reduced by the spring 4 while the hollow cylindrical buffer members 5 are elastically transformed to absorb and reduce the vibration. At the same time, the horizontal vibration is mainly absorbed and reduced while the hollow cylindrical buffer members 5 are elastically transformed, while the spring 4 absorbs and reduces the horizontal vibration by its elasticity.

Accordingly, two compressor fixture structure units of the compressor fixture structure according to the embodiment of the present invention mutually operate to absorb and reduce the vibration of the compressor 10 by means of their elasticity, so that the transfer of the compressor vibration to a refrigerator cabinet through the coolant pipe is greatly reduced.

What is claimed is:

1. A compressor fixture structure for a refrigerator, comprising a plurality of compressor fixture structure units each of which includes:

a support fixedly placed on the bottom of a machine room of a refrigerator, having a first spring fixing member on the center portion thereof and two side walls at both ends, each upper portion of which is outwardly slanted;

a moving member having an upper plate and a lower plate which are interconnected to each other at both ends, and openings formed in the upper and lower plates, respectively, and a second spring fixing member formed on the lower plate around the opening;

a spring fixedly inserted between the first spring fixing member and the second spring fixing member;

a compressor support placed on the moving member;

a fixing shaft inserted through the moving member and the compressor support, and fixed by washers; and a plurality of hollow cylindrical buffer members fixed between the slanted upper portion and the lower plate, respectively.

2. The compressor fixture structure for a refrigerator as claimed in claim 1, wherein the support has side walls perpendicularly bent upwards, the upper portion of each of the perpendicularly bent side walls being slanted outwards, each of the slanted side walls having first two hook parts each of which is formed at opposite sides on the edges of the slanted side walls, the lower plate of the moving member having second two hook parts respectively corresponding to the first two hook parts of each of the slanted side walls, so that one of the plurality of hollow cylindrical buffer members is held by the first two hook parts and the second two hook parts, and the other one of the plurality of hollow cylindrical buffer member is held by the other first two hook parts and the other second two hook parts.

3. The compressor fixture structure for a refrigerator as claimed in claim 1, wherein each of the two hollow cylindrical buffer members are made of a thin elastic iron plate.

4. The compressor fixture structure for a refrigerator as claimed in claim 1, wherein the plurality of hollow cylindrical buffer members are two.

* * * * *